Figure 1:
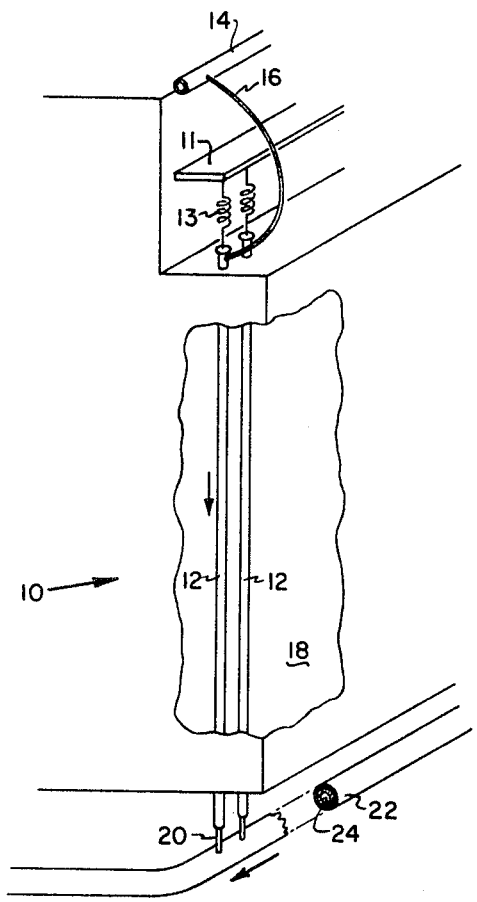

United States Patent

[11] 3,607,130

| [72] | Inventors | Arthur C. Worley<br>Morristown;<br>Frank A. Devine, Westfield, both of N.J. |
|---|---|---|
| [21] | Appl. No. | 860,611 |
| [22] | Filed | Sept. 24, 1969 |
| [45] | Patented | Sept. 21, 1971 |
| [73] | Assignee | Esso Research and Engineering Company |

[54] REFORMER FURNACE
9 Claims, 4 Drawing Figs.

[52] U.S. Cl. ................................................ 23/288 M,
23/277, 48/126, 48/196, 122/510, 122/511
[51] Int. Cl. ............................................................ B01j 9/04
[50] Field of Search ........................................... 23/288.92,
277, 284; 48/94, 105, 126, 196; 196/110,
133, 137, 129; 122/356, 510, 511

[56] References Cited
UNITED STATES PATENTS
| 1,647,570 | 11/1927 | Kling | 122/DIG. 13 |
|---|---|---|---|
| 3,062,197 | 11/1962 | Fleischer | 122/510 |
| 3,230,052 | 1/1966 | Lee et al. | 23/277 |
| 3,257,172 | 6/1966 | Kao et al. | 23/277 |
| 3,453,087 | 7/1969 | Herp, Jr. et al | 23/288 M |
| 3,460,924 | 8/1969 | O'Sullivan | 23/277 X |
| 3,467,503 | 9/1969 | Juric | 23/288 M |
| 3,475,135 | 10/1969 | Gargominy | 23/288 M |
| 3,492,973 | 2/1970 | Berkert et al. | 122/510 |

*Primary Examiner*—Joseph Scovronek
*Attorneys*—Manahan and Wright and Jay Simon

ABSTRACT: A tubular reformer furnace is provided with refractory lined outlet headers, (inlet headers may be lined) said headers being external to the furnace box in order to eliminate excessive thermal growth of the headers, and relatively small diameter unlined tubing is provided for connecting the inlet header with the tubes in order to absorb the differential thermal expansion between the tubes and headers, the small diameter tubing having more than one bend which exceeds 180°.

Arthur C. Worley
Frank A. Devine    INVENTORS

BY  *Jay Simon*    ATTORNEY

Arthur C. Worley
Frank A. Devine    INVENTORS

BY  Jay Simon   ATTORNEY

REFORMER FURNACE

FIELD OF INVENTION

This invention relates to tubular steam reformer furnaces. More particularly, this invention relates to improved reformer furnaces which comprise a furnace box, a plurality of vertically oriented tubes extending through the furnace box in which tubes steam reforming of hydrocarbons is effected, horizontal inlet headers, and horizontal outlet headers and wherein the improvement comprises providing the inlet and particularly the outlet header, with refractory linings. In one embodiment of this invention, the connection between the tubes and the outlet header is comprised of a relatively short, vertical, small diameter pipe. In another embodiment, the connection between the inlet header and the tubes comprises relative small diameter piping or tubing having more than one bend which exceeds 180° along its length, e.g., a helix.

BACKGROUND OF INVENTION

Steam reforming is a well-known process which involves the conversion of a hydrocarbon or mixtures of hydrocarbons with steam, generally in the presence of a catalyst, to hydrogen and carbon oxides in accordance with the following reactions, using methane as the hydrocarbon:

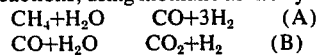
$CH_4 + H_2O \quad CO + 3H_2 \quad (A)$
$CO + H_2O \quad CO_2 + H_2 \quad (B)$ The first reaction, known as the reforming reaction, is endothermic while the second reaction, known as the shift reaction, is exothermic. Nevertheless, the overall reaction is highly endothermic and is carried out in a furnace. In a tubular furnace, tubes are arranged in the furnace and the reactants flow through the tubes, which are generally packed with a catalyst, e.g., nickel oxide.

Because the reaction is conducted at relatively high temperatures, e.g., 1400°–1600° F., thermal growth of the tubes and associated lines induces large thermal expansion movements which must be absorbed. In addition, during certain periods of operation, steam condensation can occur which in turn can cause corrosion attack of alloy components. Consequently, it is one object of this invention to provide an integrated furnace system wherein thermal growth and its associated stresses is curtailed and controlled and the possibility of corrosion attack in the critical areas of the furnace is substantially lessened, if not eliminated.

SUMMARY OF THE INVENTION

In accordance with this invention, therefore, an improved reforming furnace is provided which comprises a furnace box, a plurality of vertically oriented tubes, within which the reforming reaction is effected, and which extend through the furnace box (that portion of the tubes within the furnace box being directly exposed to the heat provided by the combustion of the furnace fuel), a horizontal inlet header for supplying steam and hydrocarbon to the tubes, relatively small diameter piping connecting the inlet header to the tubes, the piping being external to the furnace box and preferably having more than one bend in excess of 180°, a refractory lined horizontal outlet header, and a short piping connection between the tubes and the outlet header which is external to the furnace box. Additionally, the inlet header may also be refractory lined.

Essentially, the use of lined headers, particularly at the very hot outlet point, has the advantage of eliminating the use of costly alloy piping necessitated by the high outlet temperatures, e.g., 1400°–1600° F., (such as 316 stainless steel, Incoloy 800, chrome-nickel steels, etc.), and permitting the use of plain, relatively inexpensive carbon steel piping, e.g., steel having a carbon content ranging from about 0.05 to about 1.05 percent. In addition to reducing the cost of piping required at the outlet points, the lined header will run relatively cool, e.g., about 150° F. to about 350° F. so that the strength of the carbon steel is not affected due to high temperature, thereby also substantially reducing the very considerable lateral and axial movements that would be induced by thermal growth. Such movements generally require the use of elaborate and expensive guides, supports, and restraint mechanisms.

Secondarily, but still of significant advantage, unlined alloy headers retain the risk of failure by thermal shock due to inadvertent injection of steam condensate into the hot alloy header, corrosion attack (such as stress corrosion cracking) due to accumulation of steam condensate at low points in the outlet system, e.g., austenitic steels are highly susceptible to stress corrosion cracking by water having trace quantities of chlorides. Also, alloy headers, in the case of maintenance work, require special techniques and experienced personnel for welding operations. Carbon steel presents no such special problems.

DRAWING DESCRIPTION

Figure 2:
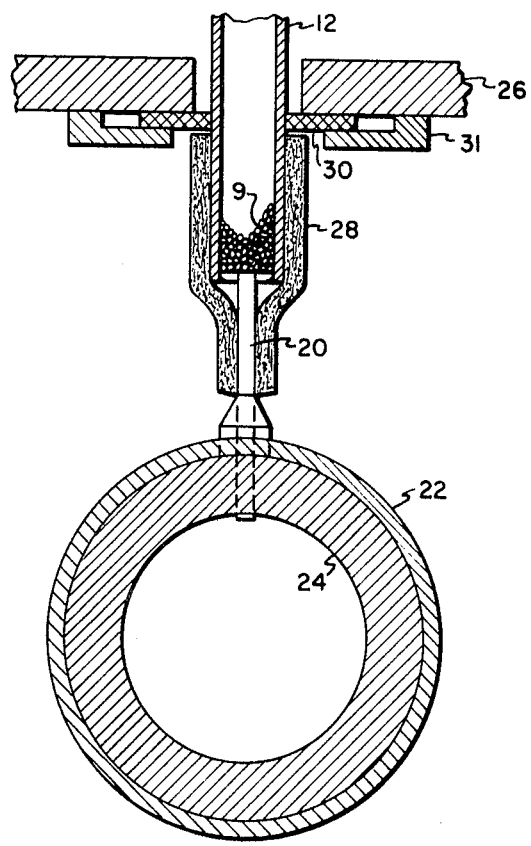
Figure 4:
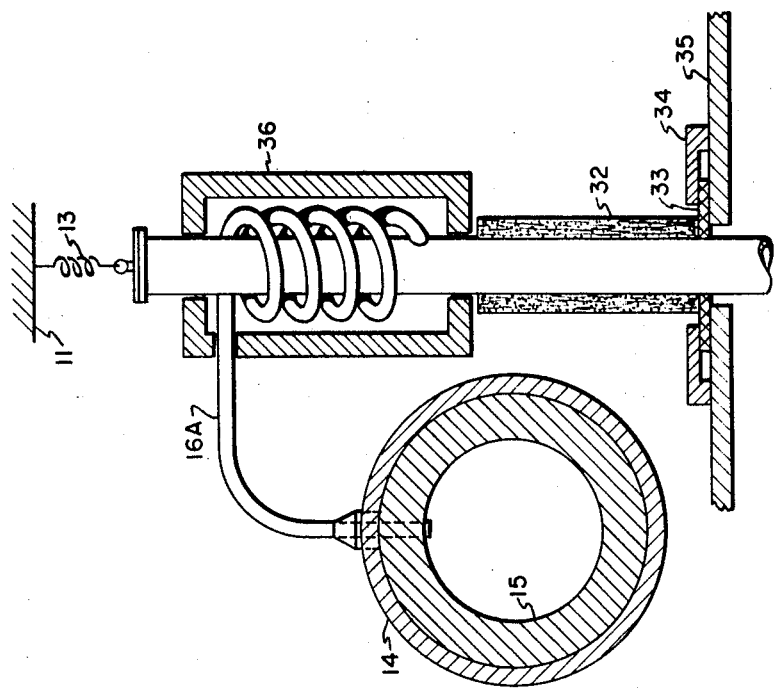
Figure 3:
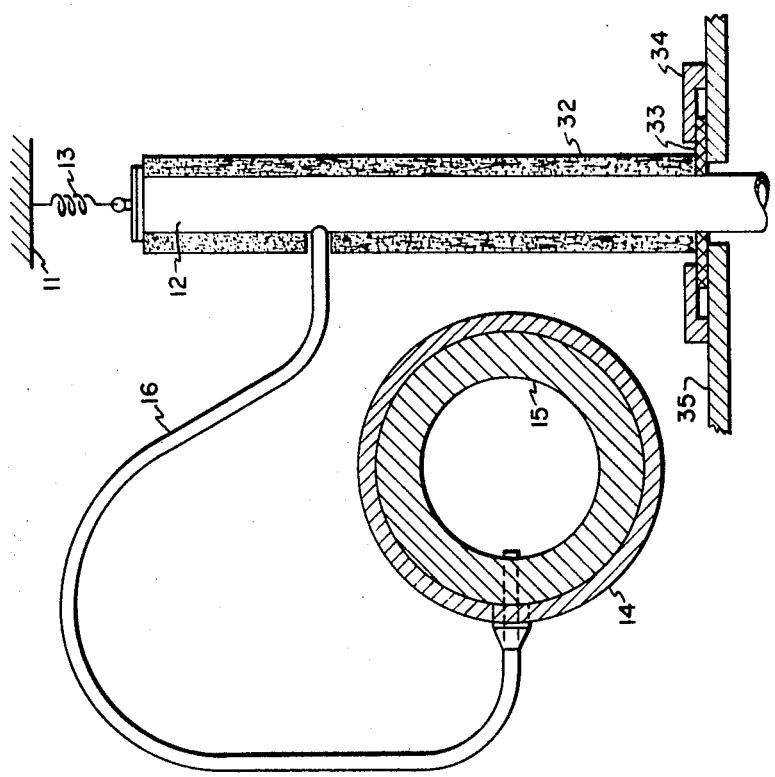

The following description of the attached drawings will serve to better illustrate this invention and the various additional embodiments and features of the improved furnace. FIG. 1 is an overall schematic representation of a reforming process. FIG. 2 is a detail view of the outlet connection of the furnace. FIG. 3 is a detail view of the inlet section of the furnace. FIG. 4 is an alternate embodiment of the inlet connection showing the small diameter piping in the form of a helix.

Turning now to the drawings, where the same numerals will identify identical parts, furnace 10 contains a plurality of tubes 12, generally vertical and arranged in parallel and often in several rows, having catalyst disposed therein and being supported from structural beam 11 by an elastic member, e.g., spring hangers 13. Inlet header 14 which may optionally be lined with refractory material, e.g., low silica, alumina refractory, transfers steam and a hydrocarbon, e.g., methane, generally from a preheater (not shown) which gasifies the reactants and preheats the feed in the range of about 400°–1250° F., e.g., 900° F., to the tubes via small diameter flexible tubing 16 (shown here for simplicity as a loop connection between the header 14 and the tube 12). The feed flows downwardly through the catalyst packed tubes 12 and is converted in accordance with reactions A and B noted above. The area of the furnace denoted as 18 is the radiant section of the furnace where the tubes are directly exposed to the combusting fuel, i.e., the tube section in this area is often referred to as the fired section of the furnace tube or the fired tube. The furnace is any conventional high temperature furnace, usually gas fired and lined with refractory brick or castable refractory.

The reformed product mixture flows out of tube 12 through a small diameter but short and inflexible outlet connection 20 and then into outlet header 22 which is internally lined with refractory material 24. The product mixture then flows through a waste heat boiler (not shown) and recovered for use, e.g., as reducing gas for a variety of purposes.

Turning now to FIG. 2, the product gases flow through tube 12 packed with catalyst 9 which may be supported on catalyst screen (not shown). The tube extends through radiant zone 18 and passes through the furnace floor 26. In order to prevent heat loss, that portion of the tube below the furnace floor 26 is insulated with suitable insulation 28 such as fiber glass, or other pipe insulating materials suitable for the temperature. The product gas then flows through short, small diameter inflexible pipe 20 into carbon steel outlet header 22 lined with refractory 24. As can be seen in FIG. 2, pipe 20 extends through refractory 24 into header 22. A stainless steel sealing ring 30 seals the tube opening in the furnace floor and allows a slip fit for the tube. The sealing ring 30 is held in place by carbon steel retaining fingers 31 mounted to the furnace floor.

The use of the short, small diameter relatively inflexible pipe 20 to convey product gases from the tube 12 to the outlet header 22 provides several important advantages. Thus, the shortness of the tube eliminates any points of condensation where corrosion or thermal shock failure might occur. The small diameter also allows the tube to be pinched off and taken offstream without need for cooling the furnace down. More importantly, however, the length of the pipe 20 is sufficiently short such that it will not be subjected to any significant thermal growth by the header and all of the thermal growth of tube 12 will be directed in an upward direction, axially with the tube. Lateral movement associated with the thermal growth of the header will be absorbed by the tube which is supported (pendulum fashion) from the top of the furnace. The short length of pipe 20 is made possible by the lining of outlet header 22. Thus, previous furnaces with unlined headers would often produce thermal growth of up to 18 inches per 100 feet of header length, thereby necessitating much longer tube to header connections to compensate for this growth. The short pipe 20 is also capable of supporting the tube in case of tube support failure.

The upward thermal growth and its associated axial and lateral stresses are compensated for, as shown in FIG. 3. Here feed in inlet header 14, lined with refractory 15 passes into a small diameter, thin wall, flexible pipe 16 which connects with the tube 12, the tube 12 passing through an opening in the top of the furnace arch 35, stainless steel sealing ring 33, and retaining fingers 34 acting similarly as sealing ring 30 and retaining fingers 31 previously described. The portion of the tube external to the furnace can be insulated 32 to preserve preheat. As previously mentioned, the short, inflexible connection at the bottom of the tube to the outlet header directs almost all thermal growth and associated stresses upwardly. The spring hangers 13 support the weight of the tubes and the full thermal movement of the tubes. Connection 16 will be utilized to absorb all of the axial and differential thermal movements between the tubes and headers. It is essential that connection 16 be flexible and have gradual bends (in excess of 180°) to absorb these strains in order to insure uniform stressing of the flexible 16 connection. The radius of each bend in he connection should range from about 3 to 6 times the diameter of the tubing to minimize stress intensification at the bends.

FIG. 4 shows an alternate variation of the bent tubing connection 16A wherein the connection to the tube 12 forms a helix surrounding a portion of tube external to the furnace box. An insulation box 36, e.g., thermal insulation lined steel, can be used to surround the coiled connection to the tube to preserve preheat. One advantage of this coiled connection is that a single insulation box serves for a bank of parallel tubes.

The coiled connection shown in FIG. 4 differs from the normal piping connection between header and tube which is in the form of a simple loop having a single plane loop per FIG. 3. In addition to the aforementioned advantages of using a thin-walled, small diameter connection between the inlet header and the tube, such a connection also has the advantage of permitting the pinching off of an individual tube, i.e., without freeing the furnace of gas and without shutting down the furnace. (This operation must be done concurrently with pinching off pipe 20.) This feature gives additional flexibility to the furnace design in that the downtime for tube replacement is minimized, that is, the furnace would not be taken out of service until an appreciable number of tubes, e.g., 10–15 percent) were judged to be bad (having deactivated or sintered catalyst, excessive hot spots, ruptures, leaks, e.g.). The bad tubes would simply be pinched off and replaced only at scheduled major furnace turnarounds. (It is obvious that, under this proposed design pinching off of bad tubes can be accomplished with the furnace onstream since the connection to the tube is external of the furnace box.) Similarly a tube can be removed from service by taking the furnace offstream but maintaining the furnace hot since all pinching operations are made outside of the furnace.

The tubes in the furnace are packed with catalyst and are generally alloy tubes, e.g., HK 40 a cast 25/20 Cr-Ni material from about 2½ inches to 6 inches outer diameter, e.g., 5 inches, with tube wall thickness ranging from about three-eights inch to about 1 inch and 30 to 40 feet long. Maximum tube metal temperatures can range up to about 1900–2000° F. The connection 16 between the inlet header and tube can be carbon steel, carbon moly or low chrome steel and will range in outer diameter from about 1 to 2.5 inches, with wall thicknesses of about 0.1 to 0.25 inches. The connection 20 between the furnace tube and outlet header should be an alloy, e.g., high nickel/chromium alloy such as Incoloy 800, 18/8 Cr-Ni Type 316; 25/20 Cr-Ni Type 310, Inconel 600, etc., about 1.0 to 2.5 inches outer diameter, 0.18 to 0.5 inches wall thickness and about 1 to 3 feet long.

Refractory linings for the headers are not critical and a wide variety of materials can be employed as long as a low silica refractory is used. Particularly preferred is alumina refractory with >90 percent $Al_2O_3$ and less than 0.1 percent silica content. Such materials are generally characterized as having the following properties: high melting, excellent abrasion resistance, high mechanical strength both at room and operating temperature, low coefficient of expansion, low thermal conductance, and resistance to disintegration as a result of sudden temperature variations. While no one material may have all of these properties, they are possessed to some degree by all refractory materials. To obtain thermal insulation, the dense refractory layer is combined with an insulating castable refractory layer to obtain the desired low overall thermal conductances, i.e., shell metal temperature of 150–350° F. This material may have lower strength, high silica content, etc.

As previously mentioned, the steam reforming reaction is well known and is generally described in such patents as U.S. Pat. No. 2,537,708 and U.S. Pat. No. 3,132,010, the process description being hereby incorporated herein by reference. Essentially, however, the reaction is effected by passing steam and a suitable hydrocarbon, e.g., methane, ethane, propane, butane, naphtha, natural gas, liquefied petroleum gas, etc., into tubes disposed in a furnace, the tube outlet temperature ranging from about 1350–1700° F., preferably 1400–1500° F., e.g., 1450° F., and operating pressures ranging from about 15–500 p.s.i.g. Carbon dioxide may be added to the feed when $H_2/CO$ mixtures of definite ratios are desired. The mole ratio of steam and/or carbon dioxide to methane equivalent is not critical and may range from about 1 to 3, suitably 2.1 to 2.6. When using steam alone, carbon monoxide reversion (to carbon dioxide and carbon) can be prevented at mole ratios above about 1.8. Space velocities can also vary widely, i.e., from about 700 volumes of methane equivalent per hour per volume of catalyst to about 1000 to 2000 volumes of methane equivalent per hour per volume of catalyst.

Any suitable steam reforming catalyst can be used, however, nickel oxide or suspended nickel oxide, e.g., alumina support, is preferred. The catalyst may have a diameter of about one-fourth inch to about one-half inch in the form of spheres or extruded pellets up to about one-half inch long. The catalyst may be modified with about 15 to 25 wt. percent calcium oxide and/or magnesium oxide.

Having now described the invention, various modifications and variations of which will be obvious to those skilled in the art, the following claims are herewith appended.

What is claimed is:

1. In a tubular furnace of the type having a plurality of vertically oriented tubes extending through a furnace box so that the upper and lower ends of said tubes are located external to said furnace box and the upper ends of said tubes are connected to inlet header means and the lower ends of said tubes are connected to outlet header means, the improvement which comprises in combination:
    elastic means located outside of said furnace box for supporting said tubes;
    flexible piping connecting said inlet header to said tubes, said piping having at least one bend the radius of which is from about 3 to 6 times the diameter of said piping;
    refractory insulation having less than 0.1 percent silica on the interior surface of said outlet header; and
    inflexible vertical pipe for connecting said tubes to said outlet header, said pipe having a diameter smaller than that of said tubes and the length of about 1 to 3 feet and extending through the refractory lining of said outlet header.

2. The furnace of claim 1 wherein the interior surface of the inlet header is provided with insulation.

3. The furnace of claim 1 wherein the flexible piping for connecting said inlet head to said tubes has at least one bend in excess of 180.°

4. The furnace of claim 3 wherein said piping is in the form of a helix.

5. The furnace of claim 1 wherein said refractory insulation comprises an insulating castable refractory layer and a dense refractory layer having less than 0.1 percent silica.

6. The furnace of claim 1 wherein said vertical pipe is an alloy steel pipe that is externally insulated.

7. A furnace primarily for the reforming of hydrocarbons which comprises in combination:
  a furnace box;
  a plurality of vertically oriented tubes extending through said furnace box in which the reforming operation is effected, the upper and lower ends of said tubes being located external to said furnace box;
  horizontally disposed inlet header means provided with insulation on the interior surface thereof;
  flexible piping for connecting said inlet header to said tubes external to said furnace box, said flexible piping having a smaller diameter than said tubes, said piping having at least one bend in excess of 180° and a radius 3 to 6 times its diameter; elastic means located outside said furnace box for supporting said tubes;
  horizontally disposed outlet header means provided with insulation on the interior surface thereof, said insulation being a refractory lining having less than 0.1 percent silica;
  vertical alloy piping for connecting said tubes to said outlet header external of the furnace box, said piping comprising an inflexible alloy pipe having a smaller diameter than said tubes, and a length of about 1 to 3 feet and extending into said header through said insulation.

8. The furnace of claim 7 wherein that portion of the tubes external to the furnace box is insulated.

9. The furnace of claim 7 wherein said insulation comprises an insulated castable refractory layer and a dense refractory layer having less than 0.1 percent silica.